United States Patent [19]
Hershey et al.

[11] Patent Number: 5,481,539
[45] Date of Patent: Jan. 2, 1996

[54] DATAGRAM COMMUNICATION SERVICE OVER A CELLULAR TELEPHONE NETWORK

[75] Inventors: John E. Hershey, Ballston Lake, N.Y.; Amer A. Hassan, Cary, N.C.

[73] Assignee: General Electric Company, Schenectady, N.Y.

[21] Appl. No.: 267,328

[22] Filed: Jun. 29, 1994

[51] Int. Cl.$^6$ .............................. H04B 7/212; H04B 7/26
[52] U.S. Cl. ...................... 370/85.3; 370/94.1; 370/95.3; 379/59; 455/33.1; 455/54.1
[58] Field of Search ............................... 370/13, 13.1, 60, 370/85.2, 85.3, 85.6, 85.7, 85.13, 94.1, 94.3, 95.1, 95.3; 379/58, 59, 60; 455/7, 9, 11.1, 33.1, 33.2, 34.1, 34.2, 53.1, 54.1, 54.2, 56.1, 88, 89; 340/825.5, 825.51; 371/32, 33

[56] References Cited

U.S. PATENT DOCUMENTS

| | | | |
|---|---|---|---|
| 4,504,946 | 3/1985 | Raychaudhuri | 370/95.3 |
| 5,151,926 | 9/1992 | Chennakeshu et al. | 375/330 |
| 5,159,592 | 10/1992 | Perkins | 370/95.1 |
| 5,202,901 | 4/1993 | Chennakeshu et al. | 375/330 |
| 5,283,815 | 2/1994 | Chennakeshu et al. | 375/330 |
| 5,301,194 | 4/1994 | Seta | 370/95.1 |
| 5,303,234 | 4/1994 | Kou | 370/85.2 |
| 5,339,316 | 8/1994 | Diepstraten | 370/85.3 |

OTHER PUBLICATIONS

"MLSE Receiver for TDMA Digital Mobile Radio" by R. D'Avella, L. Moreno, M. Sant'Agostino, IEEE Journal of Selected Areas in Communications, vol. 7, No. 1, Jan. 1989, pp. 122–129.

"The Viterbi Algorithm" by G. D. Forney, Jr., Proceedings of the IEEE, vol. 61, No. 3, Mar. 1973, pp. 268–278.

"Publication TR45.3.3/89.3.14.5 for the TIA Technical Subcommittee, TR–45.3, W.G. IEEE, Modulation Task Group" provided by Motorola, Inc. Arlington Heights, Ill. Mar. 14, 1989.

EIA/TIA "Interim Standard—Cellular System, Dual Mode Mobile Station—Base Station Compatability Standard", Publication IS–54–A by the Electronics Industries Assoc., Engineering Dept. Jan. 1991, Version Mar. 1, 1991, pp. 83–86.

"Digital Cellular Systems for North America" by C. Sundberg, in Esshadri of AT&Ta Bell Laboratories, Murray Hill, N.J. 1990—IEEE, pp. 405.5.1–405.5.5.

U.S. patent application Ser. No. 08/267,346, "Parallel Dataword Modulation Scheme", by J. E. Hershey, G. Saulnier.

U.S. patent application Ser. No. 08/267,348, "Datagram Message Communication Service Employing a Hybrid Network", by J. E. Hershey.

Primary Examiner—Alpus Hsu
Attorney, Agent, or Firm—Lawrence P. Zale; Marvin Snyder

[57] ABSTRACT

A highly fault tolerant method of radio communication piggybacked upon time division multiple access (TDMA) digital cellular radio telephone systems transmits message packet through a distributed network of transmitter/receivers, (tranceivers) mobile units, each having a unique identification (ID) number. An initiating mobile unit creates a message packet having the ID of a mobile unit intended to receive the message packet. It then broadcasts the message packet in a non-interfering fashion to local mobile units within its transmission range, at a time period which does not overlap a time slot in which it communicates with a cellular base unit. Each mobile unit which receives the message packet checks to see if there are errors and sends an acknowledgement if no errors. The mobile units determine valid message packets by determining if the message has not expired, if it has not been seen before and there were no errors in the received message packet. The mobile unit also determines if the transceiver ID in the message packet matches its own transceiver ID, and if it does, the message has been successfully transmitted to its intended mobile unit. If the message packet is valid and the mobile unit IDs do not match, the mobile unit broadcasts the message to other local mobile units until a predetermined number of acknowledgements are received, or until the message expires. The mobile units which receive the message packet repeat the process. A message is transmitted from a sending mobile unit to a receiving mobile unit without any interaction with a cellular base unit.

3 Claims, 6 Drawing Sheets

DATAGRAM COMMUNICATION SERVICE OVER A CELLULAR TELEPHONE NETWORK

CROSS REFERENCE TO RELATED APPLICATIONS

This invention is related to U.S. patent applications Ser. No. 08/267,347 filed Jun. 29, 1994 "New Mobile Telecommunications Device and Service" by Amer Hassan, John Hershey, Howard Lester, Charles Puckette; Ser. No. 08/267,346 filed Jun. 29, 1994 "Parallel Dataword Modulation Scheme" by John Hershey, Gary Saulnier; and Ser. No. 08/267,348 filed Jun. 29, 1994 "Datagram Message Communication Service Employing a Hybrid Network" by John Hershey; all assigned to the present assignee and hereby incorporated by reference.

BACKGROUND OF THE INVENTION

1. Field of the Invention

The present invention relates to the field of digital message transmission and more specifically transmitting message packets over a cellular telephone network.

2. Description of Related Art

In a time division multiple access (TDMA) radio communication system, a base unit controls communication with mobile units within its cell. Each mobile unit is assigned a time slot within a TDMA frame in which to communicate with the base unit.

When the base unit is communicating with one mobile unit, the other mobile units wait idle until there it is their turn to send or receive messages. As more mobile units are added, and/or the message traffic increases, the idle time becomes longer.

Large volume message transmission becomes very costly, slow and complex when the system is driven by a 'master' controller, such as a cellular base station, which organizes the mobile units under its control.

In addition to complexity and speed, a centrally controlled communication system is more prone to errors. If an error occurs during communication between the base and mobile unit, there is little or no redundant communicating units. Also, since the base unit controls when communications occur, a timing error by the base may cause many problems with the transmissions of the mobile units.

Cellular radio transmissions tend to be a problem in areas, such as cities, having high rise buildings. The buildings tend to block radio transmissions and cause 'shadowing'. A mobile unit communicating with base unit signals has to contend with these shadowing effects. As the mobile unit moves into an area which experiences shadowing, the received signal is attenuated, causing interference and may reduce the signal quality to a degree that the message may not be received at all.

One method of combating shadowing is to position repeaters having antennae dispersed around an area in which radio communication is desired. Antenna rental space has become increasingly more costly causing this method to become increasingly unattractive. Coupling this problem with an increased demand for information transmission has resulted in a need for a method of transmitting information which is simple and inexpensive.

Currently there is a need for a system of radio transmission capable of transmitting an increased volume of information which is simple, inexpensive, and more fault tolerant and efficient than conventional systems.

SUMMARY OF THE INVENTION

A cellular telephone mobile unit creates a message packet, which it desires to transmit to an intended receiver having a unique ID number, such as a mobile telephone number. The ID number of a mobile unit to which this message is to be transmitted, is obtained from a database such as a telephone directory. The message packet is comprised of a 'DESTINATION ID, a 'MESSAGE ID' number, a 'TIME STAMP', a packet 'LIFETIME', a number of minimum receivers which should receive the transmitted message packet, and the message information along with synchronization parameters. The initiating mobile unit broadcasts the message packet in low power, at times other than its TDMA time slots allocated for its communication with the base unit, to local mobile units in the reception area. Each mobile unit which receives the message without errors responds with an acknowledgement signal. Each mobile unit which receives the broadcast determines if the message packet is valid by determining if it does not have errors, has not expired, and the message has not been received before. Invalid message packets are disregarded. The mobile units then compare the mobile unit ID of valid message packets with its own internal ID number for valid message packets. If the IDs match, the message has been successfully transmitted to the intended mobile unit. If not, the message packet is re-broadcast at low power during a slot time which is not allocated for its communication with the cellular base station, to other mobile units within its radio transmission region. Since each mobile unit disregards broadcasts which it has previously received, the broadcast propagates with a wavefront in a direction away from the sending mobile unit. The message transmissions are executed without any intervention or control from the cellular telephone base station, thereby resulting in direct message transmission with little or no overhead. The probable range over which the message is transmitted may be limited by adjusting the 'LIFETIME' field of the message packet.

OBJECTS OF THE INVENTION

It is an object of the present invention to provide a simple method of relaying information to a desired unit in a cellular radio telephone system without requiring the use of the base station.

Another object of the present invention is to provide a simple method of employing radio transmission to transmit information in a cellular telephone radio system to a communicating unit unencumbered by the effects of 'shadowing'.

Another object of the present invention is to provide a highly fault tolerant method of relaying information to a desired communicating unit in a cellular radio telephone system.

BRIEF DESCRIPTION OF THE DRAWINGS

The features believed to be novel are set forth with particularity in the appended claims. The invention itself, however, both as to organization and method of operation together with the further objects and advantages thereof may best be understood by reference to the following description in conjunction with the accompanying drawings in which:

DETAILED DESCRIPTION OF THE INVENTION

Figure 1:
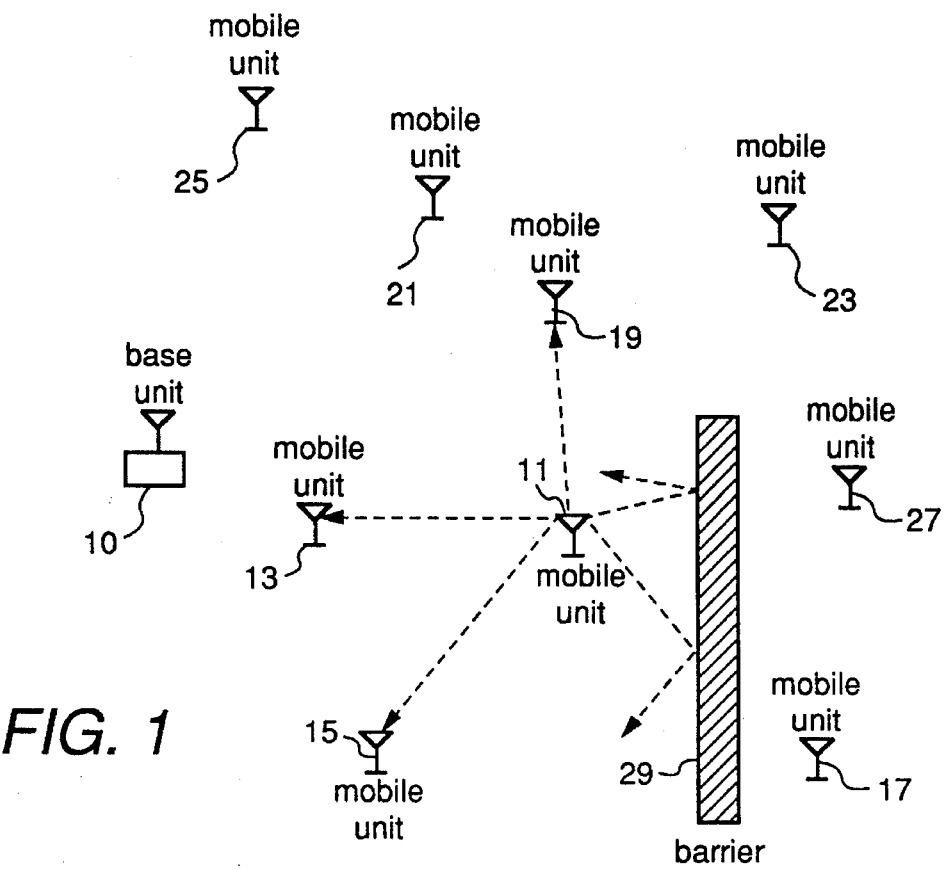
FIG. 1 is a drawing illustrating the problem of message transmission in cellular telephone radio communications.

In FIG. 1, a cellular telephone base unit 10 controls the communication of a plurality of mobile units 11, 13, 15, 17, 19, 21, 23, 25 in its assigned cell. In U.S. digital cellular telephones, the base communicates with mobile units in a time division multiple access (TDMA) scheme, with communication taking place between the base and a single mobile in a time slot allocated to this unit. In FIG. 3, base unit 10 is currently communicating with mobile unit 21. The remaining mobile units wait, are idle, until their time slot to communicate. If there are a large number of mobile units in a cell, there is a longer idle time.

Figure 2:
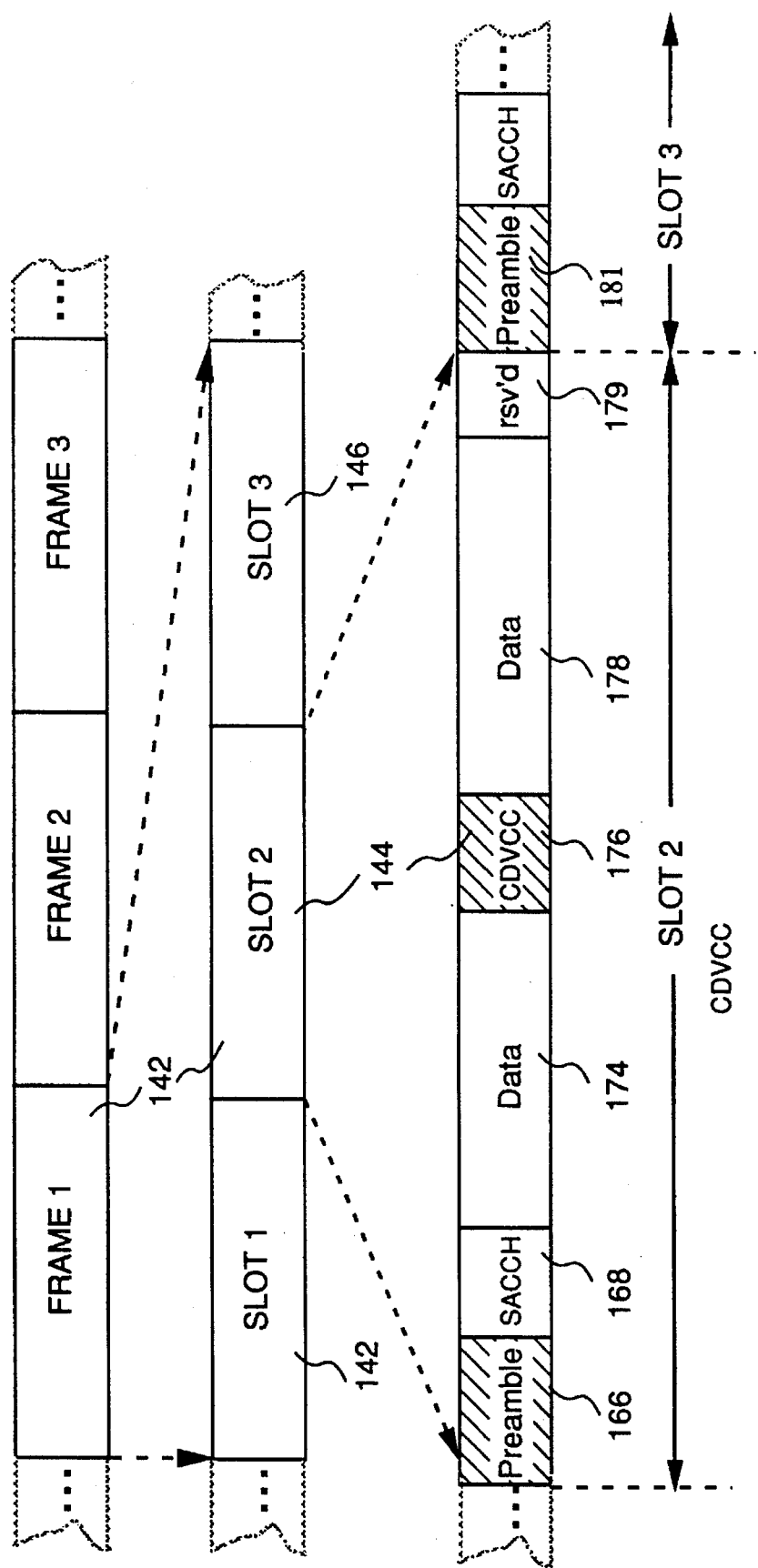
FIG. 2 is an illustration of frame/slot data format for U.S. digital cellular time division multiple access (TDMA) telephone systems.

In FIG. 2 a data slot structure for U.S. digital telephone, standard IS-54, which is a TDMA system is illustrated. A continuous RF transmission signal is sectioned into frames of data. Each frame, such as frame 140 is divided into three time slots, or data slots, one of which is slot 2, 144 of FIG. 2. Even though the slot illustrated in FIG. 1 is U.S. digital cellular telephone communication format, the present invention applies equally to other formats for digital transmission, but the TDMA U.S. cellular telephone format was chosen for purposes of describing the invention.

A U.S. digital cellular telephone communication slot is comprised of a preamble 166, a slow associated control channel (SACCH) block 168, the encoded data 174 and 178 (which may be encoded speech data), a coded digital verification color code (CDVCC) block of data 178 and a reserved block of data 179 described on p. 85–86 of January '91 EIA/TIA "Interim Standard— Cellular System, Dual Mode Mobile Station—Base Station Compatibility Standard" Publication IS-54-A by the Electronics Industries Assoc., Engineering Dept.

The present invention is a low cost data message packet transportation service ideally suited for a large metropolitan area in which point to point communications are either impossible or costly. The present invention delivers message packets in a 'DATAGRAM' mode in that a message packet is initiated and relayed with best effort for delivery with no guarantee, except at a possible higher level of the user protocol. The packets are relayed through a network of available mobile transmitter/receivers, "transceivers", of a TDMA cellular telephone system. The delivery time of a packet is expected to be highly variable. The service is not expected to meet the needs of real time communications such as voice but rather to address the needs of large volume data transport.

Figure 3A:
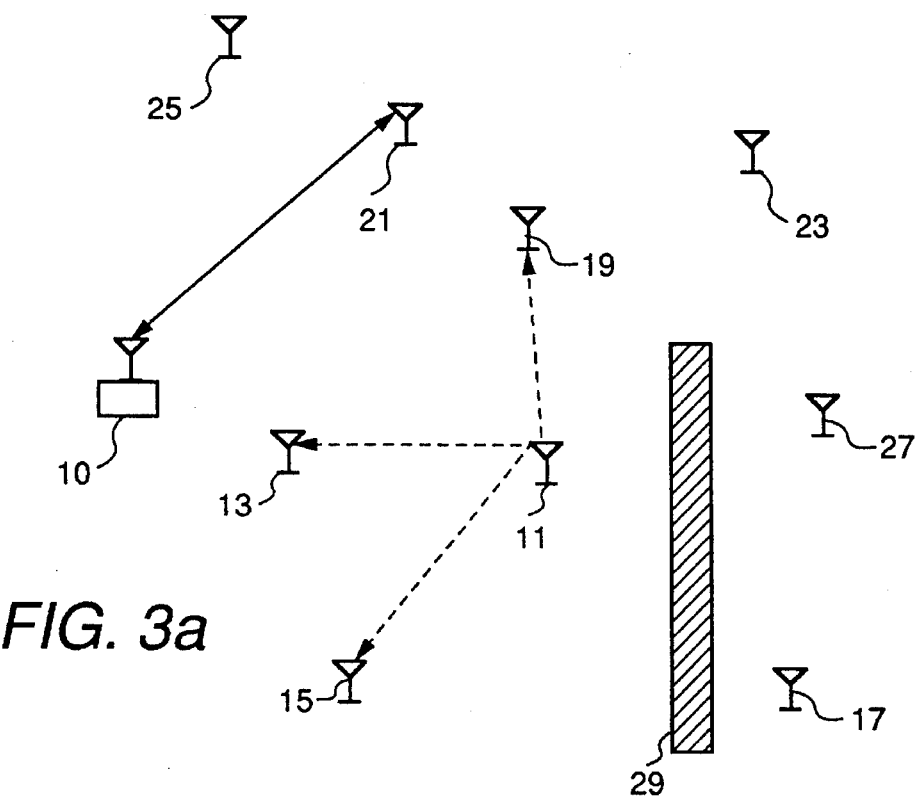
FIGS. 3a, 3b, and 3c together illustrate a method of message communication according to the present invention.

In FIG. 3a base unit 10 is communicating with mobile unit 21. An operator at mobile unit 11 would like to transmit to mobile unit 27. To perform regular communication in a TDMA system, it would require mobile unit 11 to transmit its message to base unit 10 which then would forward the message to mobile unit 27. This requires the base unit to receive once in the time slot allocated for mobile unit 11, and transmit once in the time slot for mobile unit 27. There are additional acknowledgement signals which run in directions opposite the transmitted message. In areas where base unit 10 is already overloaded, a problem may occur. At the same time, as the number of mobile units in a cell increases, the idle time each mobile unit has increases. Also, in this example, barrier 29 blocks or hinders radio wave transmission from base unit 10 to mobile unit 27.

The present invention is aimed at freeing base unit 10 in a TDMA radio system, and utilize the idle time of the mobile units. A distributed network, employing the mobile units, functions simultaneously with the TDMA system. It would allow a great deal of message transmission without the need of control from base unit 10.

Since there are many existing mobile units already in place, this system may be functioning with only ROM chip changes to the existing mobile units.

The best use for the present invention is in metropolitan areas where the density of cellular telephones is greatest, and also the problem of overloading base units is more acute. The present invention functions by passing the message along to nearby units, and therefore functions better in denser areas.

Shadowing becomes a problem for cellular telephones. Shadowing occurs when radio waves are blocked or partially blocked by objects of the environment, such as buildings, it is sometimes difficult to transmit from one unit to another unit at a given time due to their relative locations. At some time later, however, a mobile unit may move into a location which has a direct line of sight, is within the range of the base unit, and does not experience any other radiowave transmission obstacles. At this time, both mobile units may communicate information.

Figure 4:
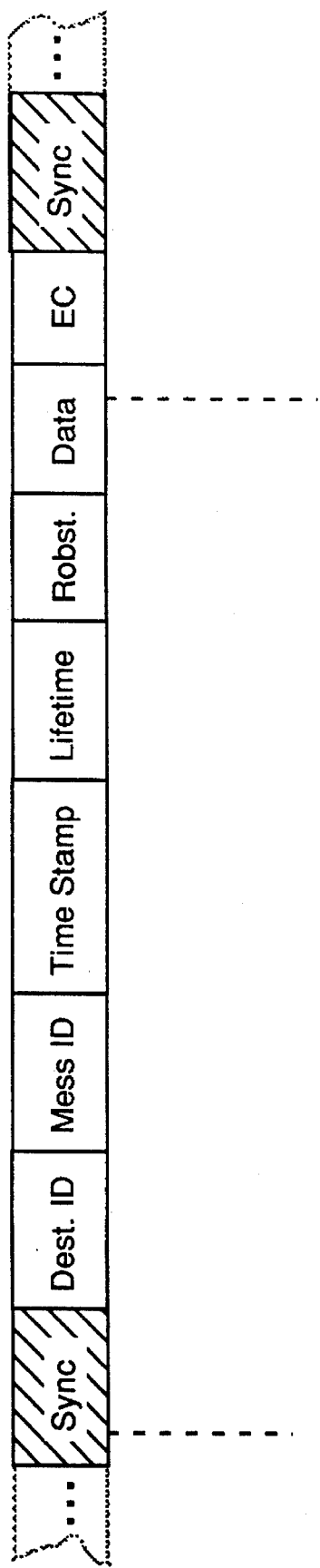
FIG. 4 illustrated a message packet structure compatible with the present invention.

Referring back to FIG. 3a, information desired to be transmitted may be data or digitized analog information and provided to mobile unit 11. This information is stored as a message packet, as shown in FIG. 4. The message packet fields are:

SYNCH: This is a unique word or "flag". As is common in bit-oriented protocols, it serves to both mark the beginning and termination of a message packet.

DESTINATION ID: The unique identification number of the mobile unit intended to ultimately receive the message packet.

MESSAGE ID: This is the packet's identification number. It includes both the packet's originator's address and a packet number assigned by the packet originator.

TIME STAMP: This specifies the time the packet was launched into the network.

LIFETIME: The lifetime beyond which the packet will not be useful.

ROBUSTNESS: This integer specifies the minimum number of different receivers who must accept the packet.

DATA: The data or message to be conveyed by the packet.

EC: The error check— most likely an error detecting word/cyclic redundancy check (CRC).

The message packet is then encoded and transmitted, in a non-interfering fashion over a radio signal from mobile unit 11 to mobile units in the nearby vicinity. A non-interfering transmission is one which is transmitted, during some time slot which is not allocated to transmitting mobile unit, and causes less than a predetermined acceptable amount of interference to the base unit and the mobile unit it is currently communicating with. The transmission may use a frequency allocated to another cell, or transmit in low power which has a power region which causes less than an acceptable amount of interference at the base unit.

Mobile unit 11 will try to successfully transmit the message packet to a number of receivers defined in the 'ROBUSTNESS' field of the message packet before the message expires. It, as all transmitting mobile units, listens and keeps track of the number of acknowledgement signals ('ACK') received, and also if the message has expired. This is determined by comparing a current time to the 'LIFETIME' value added to the 'TIME STAMP' value in the message packet. When the current time exceeds this sum, the message has expired.

Mobile units 13, 15 and 19 receive the message packet transmitted by mobile unit 11. Mobile unit 27, however is behind a barrier 29, which partially or totally blocks the transmission such that mobile unit 27 does not receive the message packet. Radio barrier 29 may be a physical barrier such as a mountain or buildings; or it may some other type of interference such as a local atmospheric disturbance, or stray radiofrequency transmissions which impair the radio signal being transmitted from mobile unit 11 to mobile unit 27. Therefore, even though mobile unit 27 is in close proximity to mobile unit 11, transmission of a direct signal between the mobile units is received with little signal quality. In this case, transmission between the two will become inaccurate or garbled depending upon the degree of radio signal transmission attenuation or interference.

Recipient mobile units 13, 15 and 19 determine if there was an error in transmission by checking the 'EC' field of the message packet. An acknowledge message ("ACK") is sent if the message is received without error. The message packet is checked to determine if it has expired, and erasing the message packet if it has. The message packet is checked to determine if it has been received before. A list of past 'MESSAGE IDs' is retained in a rolling buffer and compared to the received message packet. Message packets which have been received with no errors, have not expired and do not have 'MESSAGE IDs' which appear in a rolling buffer are determined to be valid message packets. The recipient mobile units compare their internal ID with the 'DESTINATION ID' in the message packet. If they match the message packet has been successfully transmitted to its intended mobile unit. If the IDs do not match, then valid message packets are then broadcast to nearby mobile units at a time which would not overlap the time slot allocated to this mobile unit.

Figure 3B:
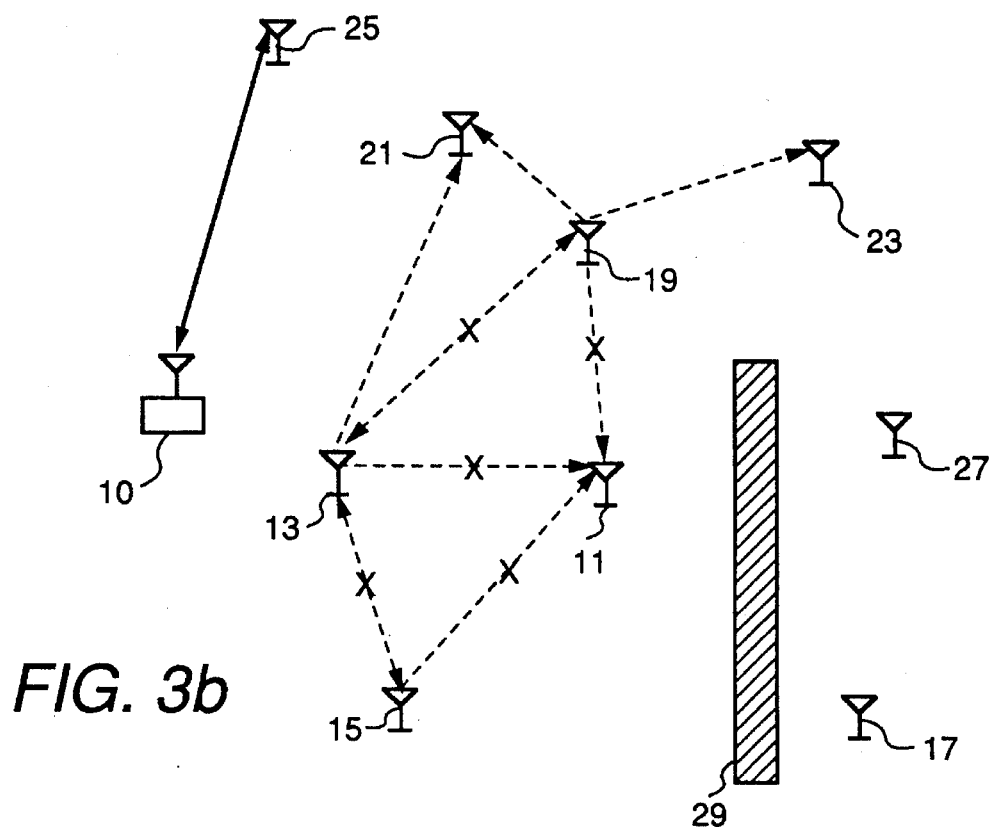

In FIG. 3b, base unit 10 is currently communicating with mobile unit 25. Mobile unit 13 broadcasts to mobile units 11, 15 and 21; mobile unit 15 broadcasts to mobile units 11 and 13; and similarly, mobile unit 19 broadcasts the message packet to mobile units 11, 21 and 23.

After the broadcasts illustrated in FIG. 3b, all receiving mobile units determine if the message packet was received with no errors and send an 'ACK' signal. Then the message packet is tested to determine if they are valid. Message packets broadcast to mobile units 11, 13 and 15 and 19 are have been received before, and are erased, as represented by an "x".

Figure 3C:
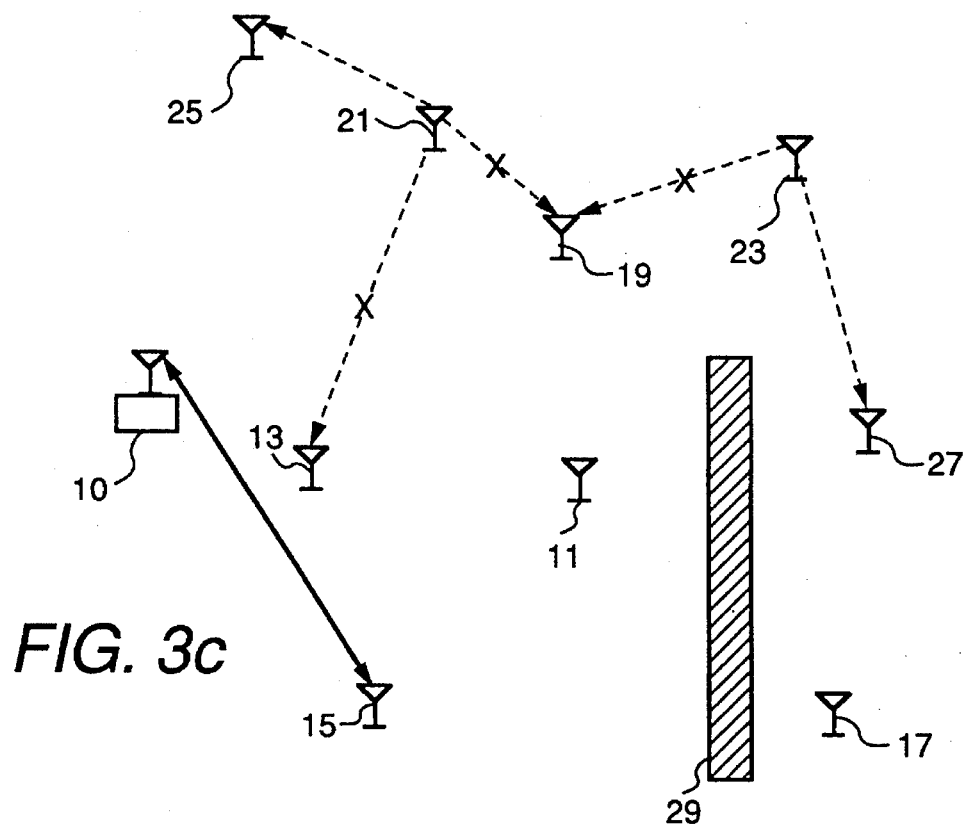

In FIG. 3c, base unit 10 is communicating with mobile unit 15. Mobile units 21 and 23, having not received the message packet before determine if the message has been received with no errors, send an 'ACK' signal if it has, determines if the message is valid, and if the message is addressed to them. Since the message packet is valid and not intended for them, they broadcast the message packet.

Mobile unit 21 broadcasts to mobile units 13, 19 and 25. The message received by mobile units 13 and 19 is erased, since it was received before. Mobile unit 23 broadcasts the message packet to mobile units 19 and 27. Since mobile unit 27 has an ID which matches that of the 'DESTINATION ID' of the message packet, mobile unit 27 stores and utilizes the message packet. The message has been successfully transmitted to its intended destination without intervention or control from base unit 10, and without interfering with ongoing TDMA communication.

Another advantage of the present invention is that the message has been transmitted around barrier 29 to reach its ultimate destination of mobile unit 27.

In FIGS. 3a, 3b and 3c, the generally message spreads from its original mobile unit 11 outward. The inward signal, the signal moving back towards the original mobile unit, is eventually ignored. In this fashion, message packets may swiftly be communicated without the need of complicated control signals and reach a destination around barriers.

This 'ripple effect' may also be employed in transmitting information to a desired receiver which is far outside of the range of the initiating mobile unit.

Since the system is distributed, an error in one of the transceivers may not make a difference, in fact many errors in many receivers may also have no effect. In centralized systems, however, an error by the master controller causes errors in transmission. The present invention therefore exhibits a highly fault tolerant system for message transmission.

In order to produce a realistic system implementing the present invention, motivation is required for each of the mobile units to receive and pass on a message packet. One such method of providing this motivation is to charge each mobile unit initiating or receiving a message packet a message fee. Intermediate mobile units which receive and re-transmit the message packet are 'paid', i.e., the message fee is reduced, by a fraction of the number of message packets that the mobile unit relays. Therefore, each mobile unit has incentive to become a repeater station.

In another embodiment, 'storefronts' may be set up in which message packets may be initiated, received, or passed on. These storefronts may charge an operator a charge to receive a message addressed to them, or to initiate a message to be sent to a desired mobile unit.

A problem may occur in which a mobile trait may receive two message packets at the same time, known as a 'collision'. In Figure 3b, mobile unit 21 is shown receiving a message packet from both mobile units 13 and 19. If this occurs at the same time, there would be a collision sensed by mobile unit 21. This may also occur when a mobile unit is receiving a TDMA message from base unit 10 when it receives a message packet from another mobile unit. A collision is typically determined at a receiver. As mobile unit 21 determines the collision has occurred, it may broadcast a signal to all mobile units in its local transmission area, that a collision had occurred. Mobile units 13 and 19 may receive this indication that a collision has occurred and re-transmit the message packet in one of the methods defined above.

Logic can be built into the mobile units such that when a collision is detected, the last message packet sent would be re-transmitted, but at a time period which is staggered from that in which the first message packet was sent. This may be done in a number of ways. The timing in which each mobile unit transmits may be synchronized with the TDMA timing in which each mobile unit has a time slot in which to the transmits its information. When a collision is detected, the data may be sent during its predetermined time offset so as not to be sent at the same initiation time as previous message packet was sent.

Another possible method would be that of sending a message packet based upon a delay time after it was received. If a data collision has occurred, the delay time is either extended or shortened, the delay time is either randomly extended or shortened according to known procedures.

Figure 5A:
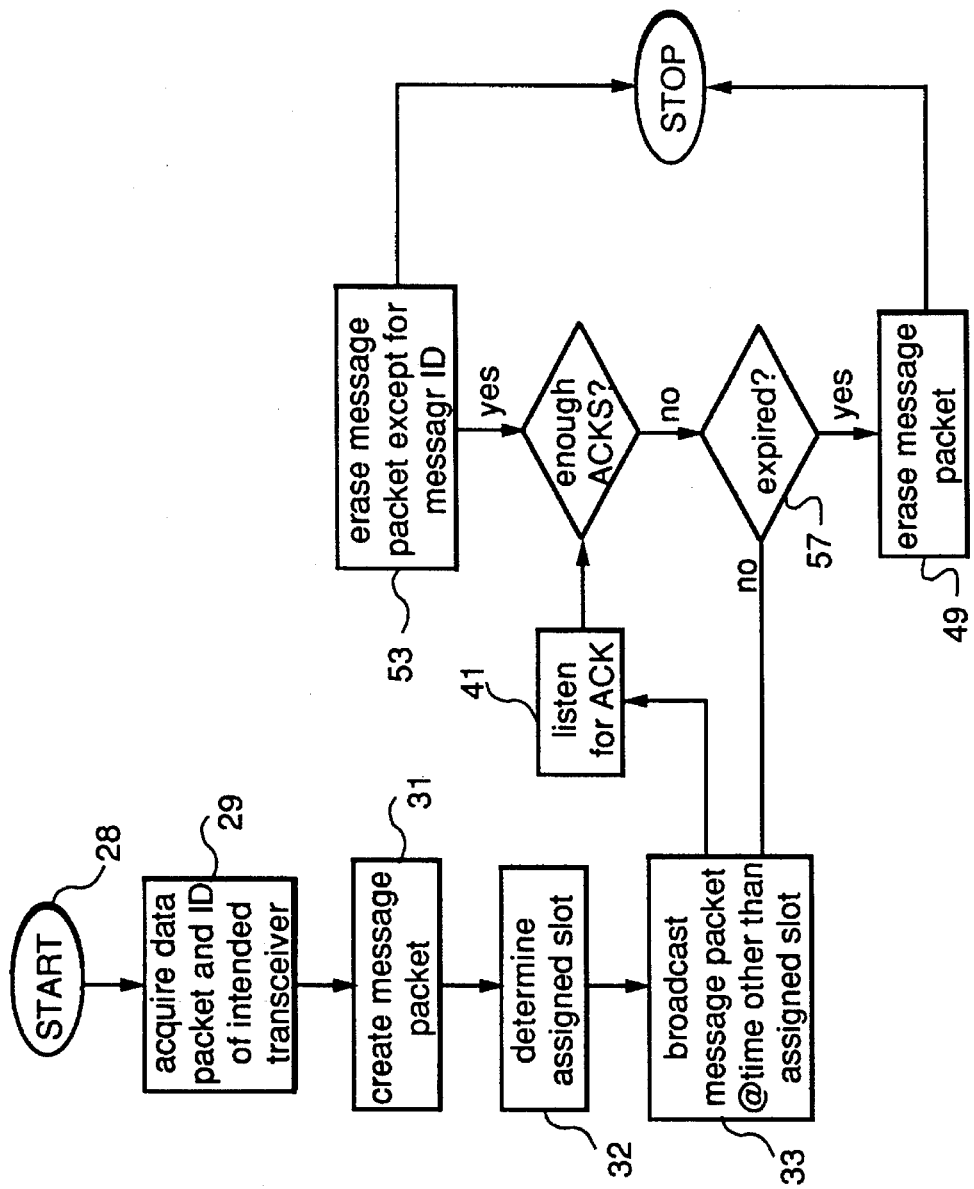
FIG. 5a is a simplified flow chart illustrating a method of initiating a message packet according to the present invention.

FIG. 5a illustrates a simplified flow diagram showing steps of initiating a message packet according to the present invention. The process begins at block 28. In block 29, information desired to be transmitted is acquired from a data source. The internal ID of the mobile unit which this information is desired to be transmitted is also acquired by means of a look-up table, or other database. In block 31, a message packet is created according to FIG. 4. The initiating transceiver may have to synthesize portions of the message packet such as the 'MESSAGE ID', which should be unique for each message packet, the 'TIME STAMP' and 'LIFE-TIME'.

In block 32, the initiating unit determines which TDMA slot which is assigned to it. It then broadcasts the message packets to all mobile units capable of receiving the data transmission in a time period which does not overlap the assigned slot, in block 33.

The mobile unit listens for acknowledgement signals in block 41. It then compares the amount of acknowledgement signals which it has received with the number in the 'ROBUSTNESS' field of the message packet. If the mobile unit has received enough acknowledgements, then the message is erased except for the message ID field of the message packet in block 53. This message ID field is used in determining if a message has been received before.

If the number of acknowledgements received by the mobile unit is less than that required, processing continues at block 57. In block 57, the 'TIME STAMP' of the message packet is added to the 'LIFETIME' also in the message packet and is compared to the current time. If the current time is later than the time stamp plus the lifetime, then the message packet has expired. If it has expired, then the message packet is erased in block 49. If it has not expired, then the message packet is rebroadcast in block 33 and the remaining steps are performed as stated above.

Figure 5B:
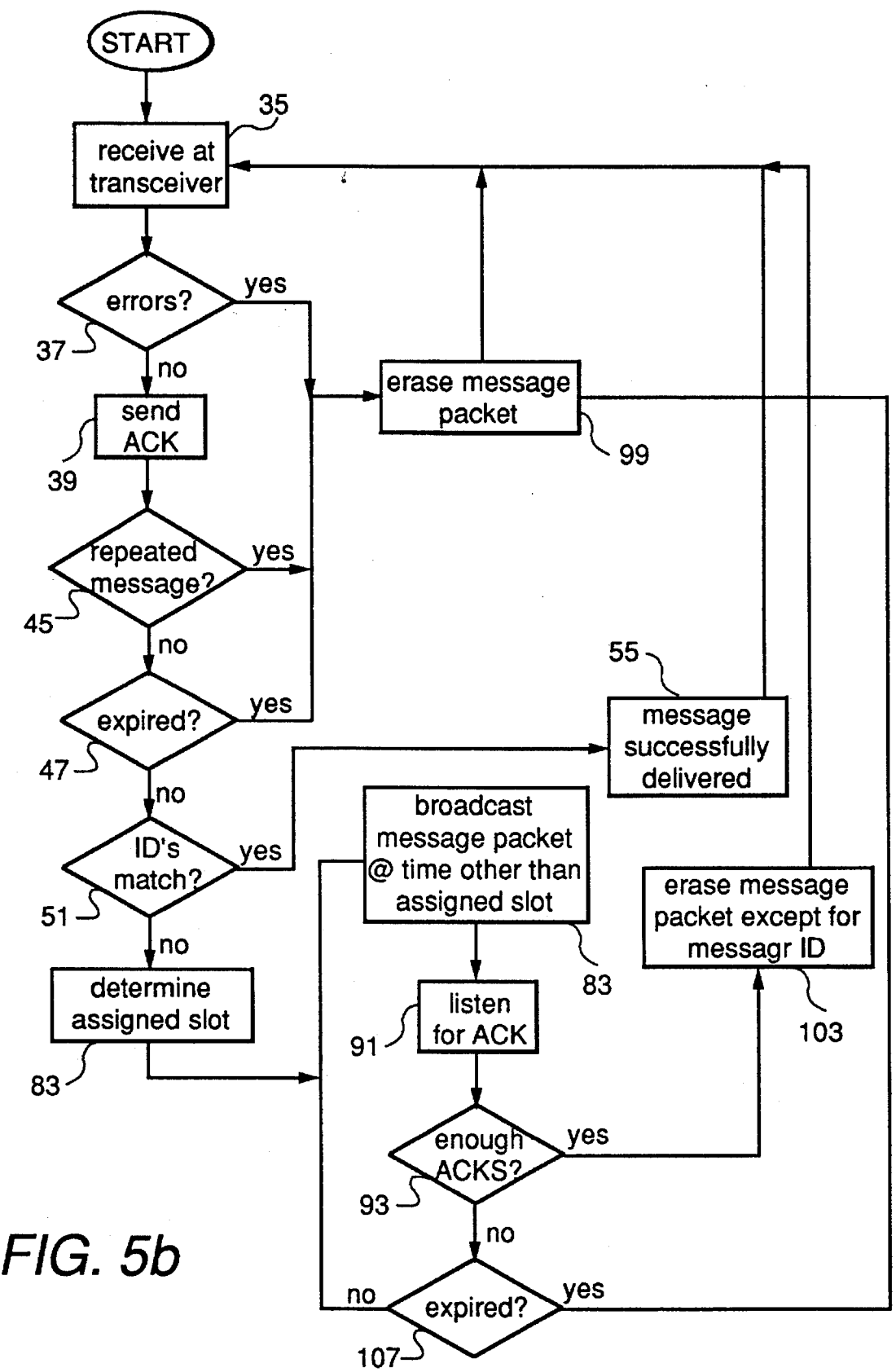
FIG. 5b is a simplified flow chart illustrating a method of receiving and re-transmitting a message packet according to the present invention.

In FIG. 5b illustrates the steps of receiving and retransmitting a message packet according to the present invention. In block 35 the message packet is received at a mobile unit. All mobile units which receive the message then determine if there were any errors in the transmission. This is done by checking the error correction field ("EC") of the message packet. This may be a cyclical redundancy check (CRC) or any other type of appropriate error detection technique. If the message is deemed to have been received without errors as determined in block 37, an acknowledgement signal is sent from the mobile unit which has received the message packet in block 39. If there has been an error detected, then the message packet is erased in block 99.

Mobile units which have received the message packet then determine if the message packet is valid which means that the message packet has been received with no errors, the message packet has not been received before as indicated by the stored message IDs, and the message has not expired, as shown in blocks 37, 45 and 47, respectively. If any of these are true, then the message is not valid. Conversely, if all of these are false, the message packet is valid. In block 51, the mobile unit receiving the message packet compares the mobile unit ID of the message packet with its own unique mobile unit ID. If the IDs match, then the message has been successfully transmitted to its intended mobile unit in block 55. Processing then continues at block 35 in which the mobile unit is a ready status waiting for new messages.

If the ID does not match that of the mobile unit, then, in block 32, the initiating unit determines which TDMA slot is assigned to it. It then broadcasts the message packets to all mobile units capable of receiving the data transmission in a time period which does not overlap the assigned slot, in block 83.

The mobile unit listens for acknowledgement signals in block 91. It then compares the amount of acknowledgement signals which it has received with the number in the 'ROBUSTNESS' field of the message packet. If the mobile unit has received enough acknowledgements, then the message is erased except for the message ID field of the message packet in block 103. This message ID field is used in determining if a message has been received before.

If the number of acknowledgements received by the mobile unit is less than that required, processing continues at block 107. In block 107, the 'TIME STAMP' of the message packet is added to the 'LIFETIME' also in the message packet and is compared to the current time. If the current time is later than the time stamp plus the lifetime, then the message packet has expired. If it has expired, then the message packet is erased in block 99. If it has not expired, then the message packet is rebroadcast in block 83 and the remaining steps are performed as stated above.

The process continues the remainder of the flow chart of FIG. 5b until the message packet has been successfully transmitted to the intended mobile unit, or mobile units have tried transmitting the message packet the number of times defined in the 'ROBUSTNESS' field of the message packet, or the message packet expires.

While only certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What we claim is:

1. A method of transmitting message information from an initiating unit to a destination unit over a time division multiple access (TDMA) mobile radio network having a plurality of mobile units, each with a unique internal identification (ID) number, comprising the steps of:

a) determining a destination unit identification number (ID) for said destination unit desired to receive information packet;

b) creating a message packet having a message ID, the destination unit ID, and said message information;

c) determining a time slot assigned to said initiating unit;

d) broadcasting the message packet to recipient mobile units in a non-interfering fashion at a time period other than that assigned to said initiating unit;

e) for each recipient mobile unit receiving the broadcast:
   1. checking for errors in the received message packet, and transmitting an ackowledgment signal if received with no errors,
   2. identifying if the message is a valid message packet, a valid message packet being one which was received without errors, has not expired and is has an message ID which does not match stored message IDs,
   3. comparing the destination unit ID to the internal ID of the recipient mobile unit for the message if it is a valid message packet,
   4. storing and utilizing valid message packets which the destination unit ID matches the internal ID of the recipient mobile unit, 5. determining a time slot assigned to this recipient mobile unit if the message is a valid message packet, and 6. re-broadcasting the message packet to other recipient mobile units in a non-interfering fashion at a time period other than that assigned to this recipient mobile unit if the message is a valid message packet.

2. The method of transmitting message information of claim 1 further comprising, after the step of re-broadcasting the message packet, the steps of:

a) listening for an acknowledgment (ACK) signal from a recipient mobile unit which has received the message packet without error;

b) comparing a count of ACK signals received to a ROBUSTNESS value in the message packet;

c) deleting the message except for the message ID if the count of ACK signals meets or exceeds the ROBUSTNESS value, and d) determining if the message has expired and erasing the message if it has expired, and e) re-broadcasting the message packet to other recipient mobile units in a non-interfering fashion at a time period other than that assigned to this recipient mobile unit if the message is a valid message packet; and f) repeating steps a–e if the message packet has not expired and the count of ACK signals does not exceed the ROBUSTNESS value.

3. The method of transmitting information of claim 1 further comprising, after the step of re-broadcasting the message packet, the steps of:

a) detecting if a collision has occurred; and b) re-broadcasting valid message packet after a randomized delay period at a time period other than the slot assigned to this recipient mobile unit to reduce the possibility of another collision.

* * * * *